US009976887B1

(12) United States Patent
Mudd et al.

(10) Patent No.: US 9,976,887 B1
(45) Date of Patent: May 22, 2018

(54) WIDER DYNAMIC ACCURACY RANGE FOR GAS DELIVERY DEVICES

(71) Applicants: Daniel T. Mudd, Reno, NV (US); Patti J Mudd, Reno, NV (US)

(72) Inventors: Daniel T. Mudd, Reno, NV (US); Patti J Mudd, Reno, NV (US)

( * ) Notice: Subject to any disclaimer, the term of this patent is extended or adjusted under 35 U.S.C. 154(b) by 874 days.

(21) Appl. No.: 14/447,573

(22) Filed: Jul. 30, 2014

Related U.S. Application Data

(63) Continuation-in-part of application No. 13/492,544, filed on Jun. 8, 2012.

(60) Provisional application No. 61/571,237, filed on Jun. 22, 2011.

(51) Int. Cl.
*G01F 1/696* (2006.01)

(52) U.S. Cl.
CPC .................................... *G01F 1/696* (2013.01)

(58) Field of Classification Search
CPC ........................................................ G01F 1/696
USPC ............................................................. 702/45
See application file for complete search history.

(56) References Cited

U.S. PATENT DOCUMENTS

| 4,145,922 | A | 3/1979 | Estrada et al. | |
|---|---|---|---|---|
| 4,987,549 | A | 1/1991 | Gee | |
| 6,301,973 | B1 | 10/2001 | Smith | |
| 6,539,968 | B1 * | 4/2003 | White | G05D 7/0635 137/10 |
| 6,658,931 | B1 * | 12/2003 | Plumb | G01F 1/699 73/204.15 |
| 7,399,118 | B2 | 7/2008 | Matter et al. | |
| 7,624,632 | B1 | 12/2009 | Hoyle et al. | |
| 2002/0046612 | A1 | 4/2002 | Mudd | |
| 2004/0204885 | A1 * | 10/2004 | Wang | G01F 1/6842 702/100 |
| 2008/0092644 | A1 | 4/2008 | Hasebe | |
| 2008/0289410 | A1 | 11/2008 | Pape et al. | |
| 2010/0030388 | A1 * | 2/2010 | Wang | G01F 1/363 700/282 |
| 2010/0116048 | A1 | 5/2010 | Fulkerson et al. | |
| 2012/0197550 | A1 * | 8/2012 | Cianflone | F02D 41/0065 702/45 |
| 2014/0000359 | A1 * | 1/2014 | Kurz | G01F 1/6983 73/204.11 |
| 2014/0352423 | A1 * | 12/2014 | Kurz | G01F 1/684 73/204.11 |

OTHER PUBLICATIONS

Mudd, Daniel T., et al., Pressure-based MFCs: Improve gas control. (thermal mass flow controller), High Beam Research, Semiconductor International, Mar. 1, 2002, 6 pages, Reed Business Information, Inc., US.

* cited by examiner

*Primary Examiner* — Ricky Ngon
(74) *Attorney, Agent, or Firm* — Law Office of Dorian Cartwright; Dorian Cartwright

(57) ABSTRACT

A mass flow meter utilizes both positive and negative slopes of operating curves for first and second thermal sensors for a wider dynamic range. First and second interfaces receive first and second signal readings from first and second thermal sensors. A selection module identifies a zone from the first and second output signals and determines an assigned thermal sensor for the zone from the zone table, regardless of whether the thermal sensor output signals from a positive or negative slope of an operating curve.

17 Claims, 9 Drawing Sheets

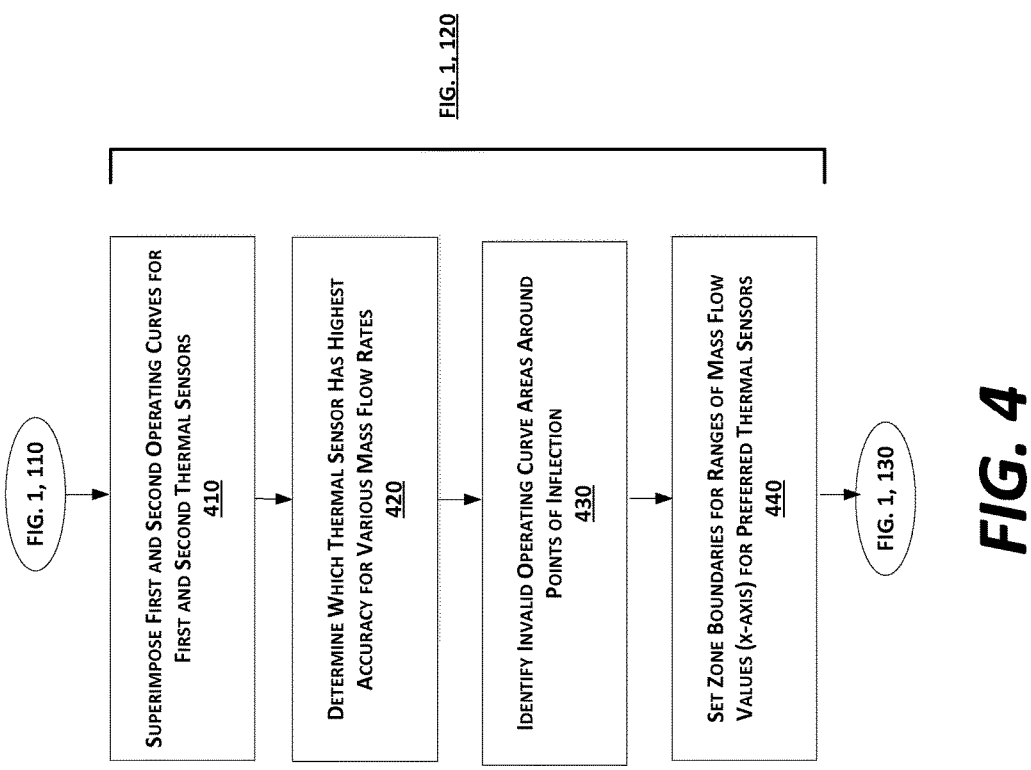

WIDER DYNAMIC ACCURACY RANGE FOR GAS DELIVERY DEVICES

CROSS-REFERENCE TO RELATED APPLICATIONS

This application claims the benefit of priority under 35 U.S.C. 120 to U.S. application Ser. No. 13/492,544, filed Jun. 8, 2012, entitled WIDER DYNAMIC THERMAL MFC (MASS FLOW CONTROLLER), by Daniel T. Mudd et al., which in turn, claims priority to U.S. Application No. 61/571,237, entitled WIDER DYNAMIC THERMAL MFC, filed Jun. 22, 2011, the contents of each being hereby incorporated by reference in its entirety.

FIELD OF THE INVENTION

The invention relates generally to semiconductor processing, and more specifically, to increasing a dynamic accuracy range for process gas delivery devices by utilizing both negative and positive sloped sections of the operating curves for multiple thermal sensors.

BACKGROUND

Gas delivery devices such as mass flow meters (MFMs) and mass flow controllers (MFCs) are important components of accurately delivering process gasses to, for example, semiconductor manufacturing. Both the shrinking size of semiconductor devices and the need to reduce the capital equipment cost in semiconductor device fabrication is driving the need for gas flows to be accurately delivered over a wider and wider range of gas flows.

Currently the need for accuracy at both low flows and higher flow on the same process gas can require two separate gas delivery lines—one gas line for lower mass flow rates and one gas line for higher mass flow rates. The conventional dynamic accuracy range of 1% of reading accuracy for a thermal MFC is roughly less 5 to 1 (20% to 100% of full scale). Alternatively, gas delivery is slowed down so that a thermal MFC can operate within its low mass flow accuracy range.

Therefore, what is needed is a technique in gas delivery systems to overcome the shortcomings of the prior art by markedly increasing the dynamic range of an MFM or MFC where the device provides the needed accuracy, and reducing the number of devices necessary for gas delivery.

SUMMARY

The present invention addresses these shortcomings by providing devices, methods and computer-readable media, for gas delivery devices such as MFMs and MFCs, to increase a dynamic accuracy range of the gas delivery devices utilizing both the negative and positive sloped sections of operating curves for multiple thermal sensors.

In one embodiment, a first interface receives first signal readings from a first thermal sensor coupled to receive a mass flow associated with the process gas across a laminar flow element. Thermal sensors can also be constructed to as a laminar flow element in addition to sensing mass flow through it. A pressure drop being common to thermal sensors and the parallel laminar flow element insures that the flow split ratio split between the components remains relatively constant and the flow measurement of thermal sensors can be used to represent the total mass flow through both the thermal sensors and the parallel bypass. The first thermal sensor is characterized by a first operating curve of mass flow versus sensor output signal. The first operating curve has a positive slope portion, a point of inflection, and a negative slope portion and resembles a bell curve when plotted logarithmically.

Also, a second interface receives second signal readings from a second thermal sensor coupled to receive a mass flow associated with the process gas across the laminar flow element. The second thermal sensor is characterized by a second operating curve having a positive slope portion, a point of inflection, and a negative slope portion. In an embodiment, the inflection points of the first and second operating curves are offset from each other so that the first and second thermal sensors reach full scale flow at different mass flow rates.

A zone look-up table is configured during a design or calibration state and is accessed during gas delivery to determine which between the first and second signal readings to use. The zone look-up table includes a list of zones corresponding to a pair of signal readings, and an assignment of either the first thermal sensor or the second thermal sensor as a preferred sensor corresponding to each zone. Given use of both the positive and negative slopes of the two operating curves with offsetting invalid ranges, the range of continuous valid readings is increased. In some embodiments, the range of valid readings need not be continuous as some mass flow rates may not have such tight tolerance requirements.

Advantageously, an MFM or MFC can accurately deliver process gas to a semiconductor process over a wider range, such as 25 to 1 (4% to 100% FS) for 1% dynamic accuracy. Furthermore, a single MFM or MFC can replace multiple devices.

BRIEF DESCRIPTION OF THE DRAWINGS

In the following drawings, like reference numbers are used to refer to like elements. Although the following figures depict various examples of the invention, the invention is not limited to the examples depicted in the figures.

FIGS. 4, 5 (A and B) and 6 (A and B) each show embodiments for configuring a preferred thermal sensor for a zone of mass flow rate values encountered during operation.

DETAILED DESCRIPTION

Described herein, a selector logic, methods and computer-readable media, for gas delivery devices such as mass flow meters (MFMs) and mass flow controllers (MFCs), to increase a dynamic accuracy range of the gas delivery devices utilizing both the negative and positive sloped sections of operating curves for multiple thermal sensors. Although the description herein refers throughout to an MFM, one of ordinary skill in the art will recognize application of these principles to other gas delivery mechanisms, such as an MFC.

I. High-Level Method 100 for Increasing Dynamic Accuracy (FIG. 1)

Figure 1:
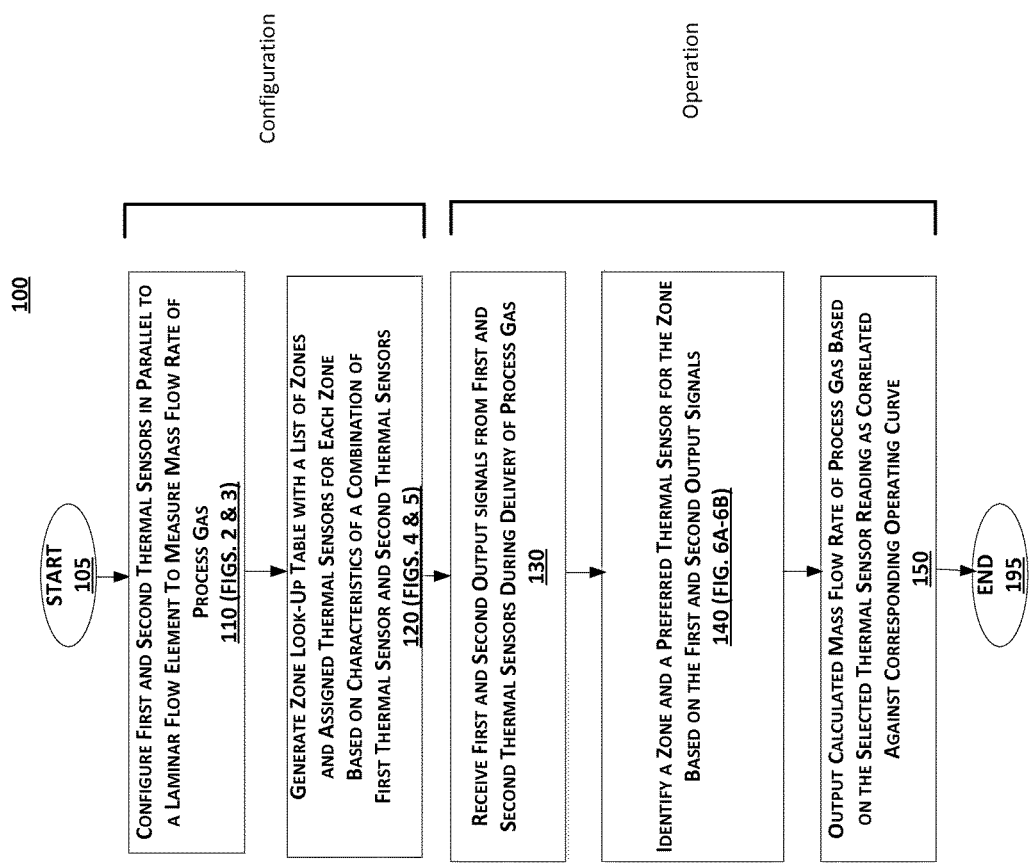
FIG. 1 is flow diagram illustrating a high-level method for increasing a dynamic range of a mass flow meter (MFM) utilizing both positive and negative slopes for operating curves of multiple sensors, according to an embodiment.

FIG. 1 is flow diagram illustrating a high-level method 100 for increasing a dynamic accuracy range of an MFM utilizing both positive and negative slopes for operating curves of multiple sensors, according to an embodiment. The method 100 is divided into two phases, a configuration phase which is part of design, manufacturing and/or calibration (see Section II), and an operation phase which is part of process gas delivery to, for example, semiconductor processing (see Section III).

Figure 2:
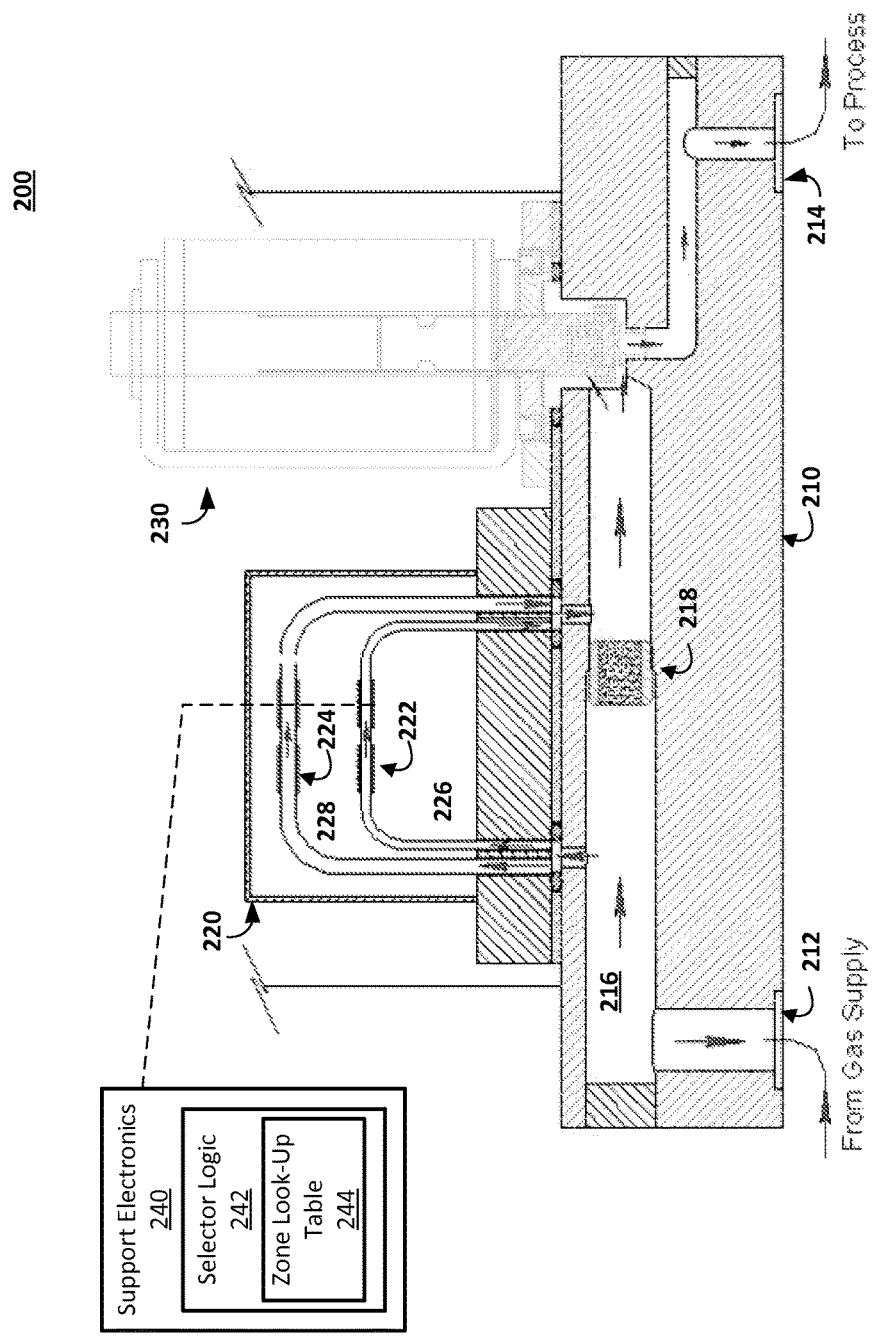
FIG. 2 is a schematic diagram illustrating an MFM with an increased dynamic accuracy range utilizing multiple thermal sensors, according to an embodiment.
Figures 3A, 3B:
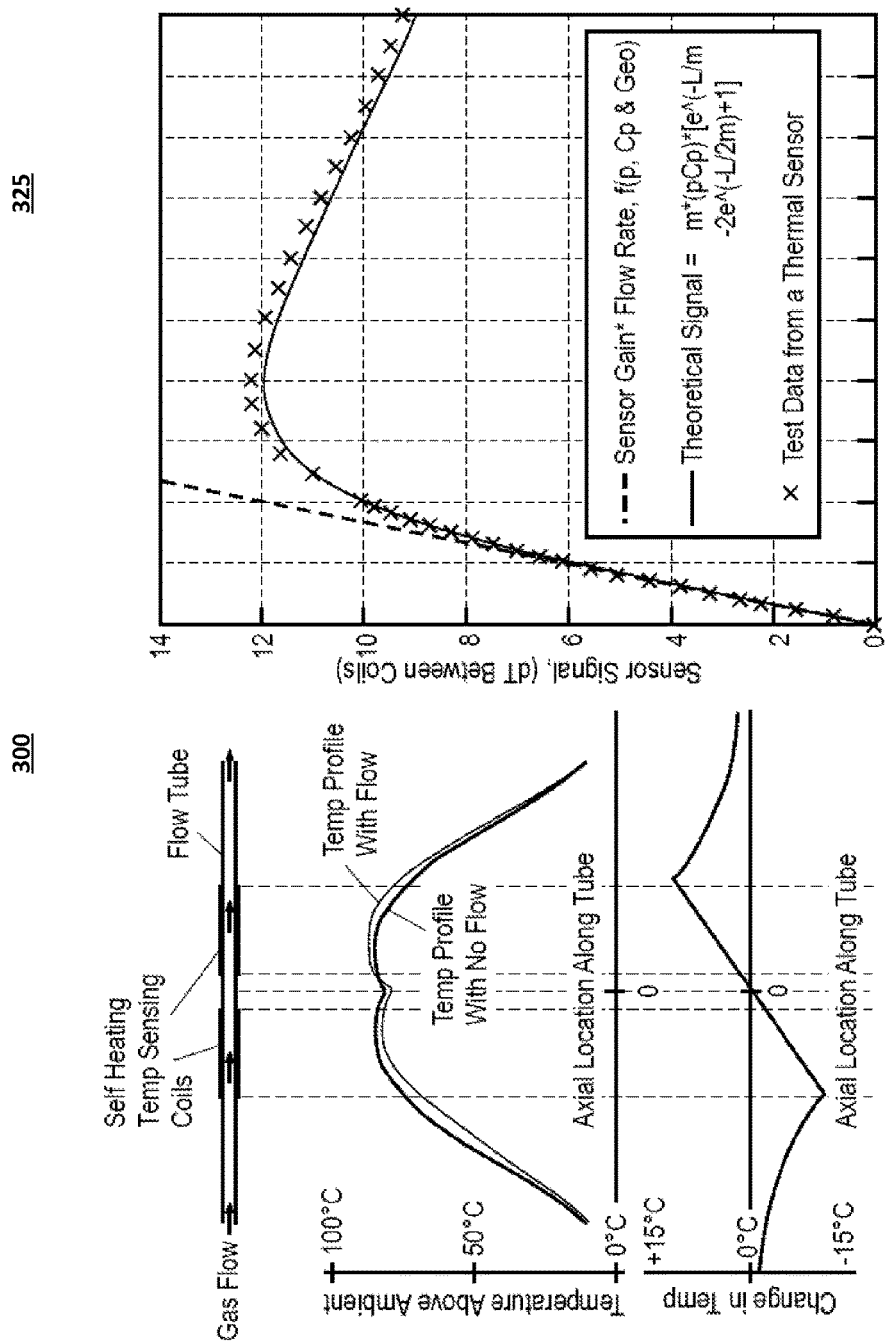
FIGS. 3A-C are graphs illustrating properties of thermal sensors and process gas, according to some embodiments.
Figure 3C:
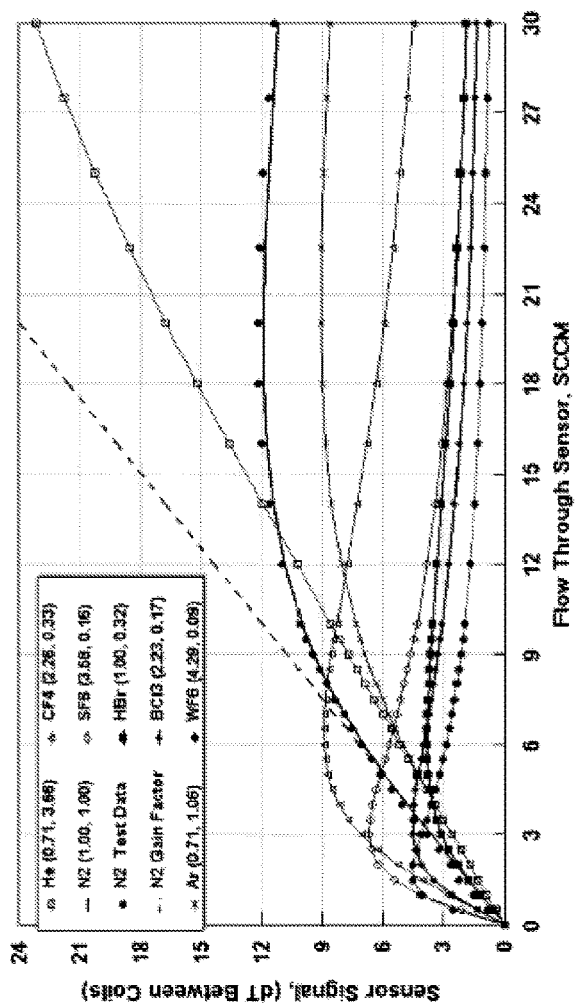

At step 110, during configuration, a first thermal sensor and a second thermal sensor are disposed in a parallel configuration (or alternatively, a series configuration) relative to each other and relative to a laminar flow element affecting mass flow rate of a process gas. The thermal sensors change temperature between upstream and downstream self-heating coils responsive to pressure changes across the laminar flow element. One embodiment of an MFM is shown in FIG. 2, and further details of thermal sensors are shown in FIGS. 3A-B.

At step 120, a zone look-up table is generated. To do so, zone boundaries are determined for mass flow rates based which thermal sensor is able to meet accuracy requirements over a range of mass flow values for the zone. The first and thermal sensor can be characterized by a first operating curve, consisting of a positive slope zone, a first inflection point, and a negative slope zone, and the second thermal sensor characterized by a second operating curve consisting of a positive slope zone, a second inflection point and a negative slope zone. Preferably, the first and second inflection points occur at different mass flow rate values. Generally, operating curves define sensor output signals versus a mass flow rate for the process gas. An output signal, in some embodiments, is similar to a bell curve graph when the flow axis is plotted on a logarithmic scale. Output signal initially increases on a positive slope as mass flow rate increases until reaching an inflection point. A thermal sensor is operating at 100% full scale at the point of inflection which is the highest value of output signal that can be output. Next, output signal decreases on a negative slope after the inflection point as mass flow rate values continue to increase. The output signal is typically not accurate enough at the inflection point and at nearby mass flow rates because the slope is not sufficient enough to cause a significant enough change in output signal corresponding to a change in mass flow rate. Some embodiments of step 120 are set forth below with respect to FIGS. 4 and 5A-B.

At step 130, during operation, first output signal readings are received from a first thermal sensor coupled to receive a mass flow associated with the process gas across a laminar flow element. Also, second output signal readings are received from a second thermal sensor coupled to receive a mass flow associated with the process gas across the laminar flow element.

At step 140, a zone is identified using, in an embodiment, both the first and second signal readings. Zone identification is necessary because a bell curve has two different x-axis readings (i.e., mass flow rate value) for a single y-axis reading (i.e., output signal value). To identify the zone, both signal readings are mapped to a specific zone of the zone table. For example, a first zone includes a positive slope portion of first and second operating curves, a second zone includes a positive slope portion of the second operating curve and an inflection point of the first operating curve, a third zone includes a negative slope of the first operating curve and an inflection point of the second operating curve, and a fourth zone includes a negative slope portion of the first and second operating curves. Each zone has an assigned or preferred thermal sensor based on accuracy requirements. In one embodiment, the most accurate thermal sensor is assigned, although in other embodiments, a sufficiently accurate thermal sensor is assigned even if not the most accurate at certain points of the zone. The preferred thermal sensor determines which of the first and second signal readings are used for mass flow rate values. Various implementations of algorithms for thermal sensor selection are detailed below in FIGS. 6A and 6B.

At step 150, the mass flow rate is calculated from the selected signal reading. In one embodiment, the signal reading is located on the associated operating curve (e.g., using the y-axis) at the identified zone, and a mass flow value is retrieved (e.g., using the x-axis).

II. Details of Method 100 (FIGS. 2-6)

FIG. 2 is a schematic diagram illustrating an MFM 200 with an increased dynamic accuracy range utilizing multiple thermal sensors, according to an embodiment. The MFM 200 includes a base 210, a sensor housing 220, an optional control valve 230, and support electronics 240.

The base 210 includes an inlet 212 from a gas supply, an outlet 214 to a process, and a conduit 216 disposed between the inlet 212 and the outlet 214. Process gas flows through the conduit 216 and experiences a pressure drop caused by the conductance of a laminar flow element 218.

The sensor housing 220 includes, in the present embodiment, two thermal sensors 226 and 228 with heating coils 222 and 224, respectively. The heating coils 222 and 224 can be wire coils would around the outside of a tube for self-heating. An inner diameter of thermal sensor 226 differs from that of thermal sensor 228, causing full scale flow to occur at different mass flows. As a result of the parallel configuration, the thermal sensors 222 and 224 are exposed to the pressure drop caused by the laminar flow element 218, resulting in output signals. In other embodiments, the thermal sensors are disposed in separate housings. In still other embodiments, the thermal sensors 226 and 228 are configured in a series configuration, whereby varying operating curves are caused by differing lengths in heating coils 222 and 224, rather than by differing inner diameters of the parallel configuration.

The control valve 230 is an optional component that adjusts mass flow rate responsive to measurements from the MFM. The additional functionality of the control valve 230 to the MFM amounts to the functionality of a mass flow controller (MFC). Additional components of the MFM 200 can include support electronics (e.g., processor and memory), additional thermal sensors, and other chambers attached to the base 210.

Support electronics 240 can be disposed proximate to the MFM 200, or can be remotely coupled via wired or wireless technologies (e.g., IEEE 802.11 or Bluetooth) to receive output signal readings from thermal sensors 222 and 224. The support electronics 240 include selector logic 242 to determine mass flow rates of a process gas utilizing thermal sensors 222 and 224. Interfaces are coupled to receive the output signal readings converted for processing. The selector logic 242 can be implemented in software, hardware, or a combination.

More specifically, a zone look-up table 244 can be accessed to determine a zone of mass flow values from a pair of output signal readings as input. Each zone has been assigned a preferred thermal sensor for accuracy within a range of mass flow values for the zone, allowing the zone look-up table to output a mass flow rate value corresponding to the preferred thermal sensor of the zone. For example, a table can be composed of rows for values of output reading 1 and columns for values of output reading 2, to identify a cell with an assigned zone or preferred sensor reading. Then, the preferred sensor reading of the zone is mapped to a specific mass flow value.

The support electronics 240 can also include computer components such as processors, mother boards, memory devices (e.g., volatile and non-volatile), buses, power sources, heat sinks, enclosures, and the like. Other gas delivery features can be implemented by support electronics 240, such as receiving set points and outputting settings for an MFC or other gas delivery device.

A. Thermal Sensors

Thermal sensors 226 and 228 are locally heated and equipped so that temperatures are determined from an upstream and downstream location in the heated region. Process gas, at an ambient temperature, flowing through the tube has a preferential cooling effect on the upstream portion of the conduit portions 226 and 228, resulting in a shift in the temperature profile as shown in graph 300 of FIG. 3A. The heat load and thus the temperature shift in this minute heat exchanger is proportional to the product of the mass flow and heat capacitance of the gas, m=k$\Delta$T=Q$\rho$Cp, as long as the heat exchanger is not overdriven. Thus the mass flow can be measured by sensing the change in the temperature profile between the "no flow" and the "at flow" conditions.

A solution of the equations governing the heat transfer and the fluid dynamics of the sensor yields the following equations for the average temperature difference between the upstream and downstream coil locations along the tube as a function of mass flow through the sensor and thus providing an indication of the mass flow.

$$TD-TU=f(m)=kQ\rho Cp[e(-L/m)-2e(-L/2m)+1]=mCp[e(-L/m)-2e(-L/2m)+1]$$

where:
k=geometric constant related to the specific sensor;
m=the mass flow rate=Q$\rho$ the product of the volumetric flow rate and density of the gas at STP;
Cp=the specific heat at constant pressure of the gas; and
L=the linearity factor which is a function of the sensor's geometry and materials of construction, and the gas's thermal conductivity, density and specific heat.

The first part of this equation, $\rho$Cp, is the Gas Conversion Factor. In one embedment, the Gas Conversion Factor is a constant whose value depends solely on the properties of the gas and it determines the slope of the initial linear region of the sensor graph plotting output vs. flow. It has been often used with varying results to predict the flow of MFCs on different gases.

The second part of the equations, [e(-L/m)-2e(-L/2m)+1], is the linearity term. In one embodiment, the linearity term is a function of the flow rate through the sensor and the lesser known Linearity Factor, L, as discussed above.

Graph 325 of FIG. 3B shows a sensor output signal responsive to flow rate for a process gas. As shown, the sensor output signal initially increases as mass flow increases, reaches a point of inflection, and then decreases as mass flow continues to increase. A thermal sensor is operating at 100% full scale at the point of inflection which is the highest value of output signal that can be output. Specific forms of sensor output signal are implementation specific, but can take the form of voltage, current, or digital output.

Graph 350 shows various operating curve values for different types of process gases. In some embodiments, an operating curve refers to values of a specific process gas for a specific thermal sensor. The curve values have a similar shape (i.e., positive slope, inflection, and then negative slope) albeit different values. Operating curves can be greatly simplified by scaling the sensor output signal (y-axis) by "$\rho$Cp" (density*specific heat) and scaling the flow signal by "L", the linearity factor. The result can be a single generalized performance curve that has the sensor output signal increasing linearly with flow until sensor is over-driven as a heat exchanger at which the signal become increasingly non-linear and eventually hits an inflection point and starts to decrease with increasing flow.

Different process gases and different thermal sensors can produce similar curves with different values. In some embodiments, the thermal sensors 222 and 224 are selected or constructed such that the flow of process gas reaches 100% full scale flow at significantly different pressure drops. For example, a flow rate through the measuring system can cause thermal sensor 222 to reach 100% full scale while thermal sensor 224 is at 25% of full scale. Further, a conductance of the laminar flow element 218 is typically much larger and is specifically sized to produce the full scale flow of the specific device which is larger than the thermal sensors 222 and 224 would permit if only the two sensors were present, thus allowing ranging of the MFM.

It should be noted that the figures representing the sensor output signal as the temperature difference between the upstream and downstream sensor, given quasi-fix power to each, is one of two dominant sensor designs used in the industry. It is predominately used by US MFC manufacturers. Japanese manufactures predominately have the same two coil configuration but vary the power to each coil so they maintain their temperature rather than letting it change with mass flow changes. The Japanese version then measures the power difference supplied to each coil and the sensor output signal is then the difference in power between the sensor supplies to each coil as representative of mass flow. It is noted that the similar duel sensor and logic algorithm can apply to the constant temperature, Japanese-style thermal sensor MFC as is being described for the U.S.-style, quasi-fix power thermal sensors.

B. Zone Boundaries and Preferred Thermal Sensor for Each Zone

FIGS. 4, 5 (A and B) and 6 (A and B) each show embodiments for configuring a preferred thermal sensor for a zone of mass flow rate values encountered during operation. One of ordinary skill in the art will recognize additional embodiments besides the ones described here in detail.

Figure 5A:
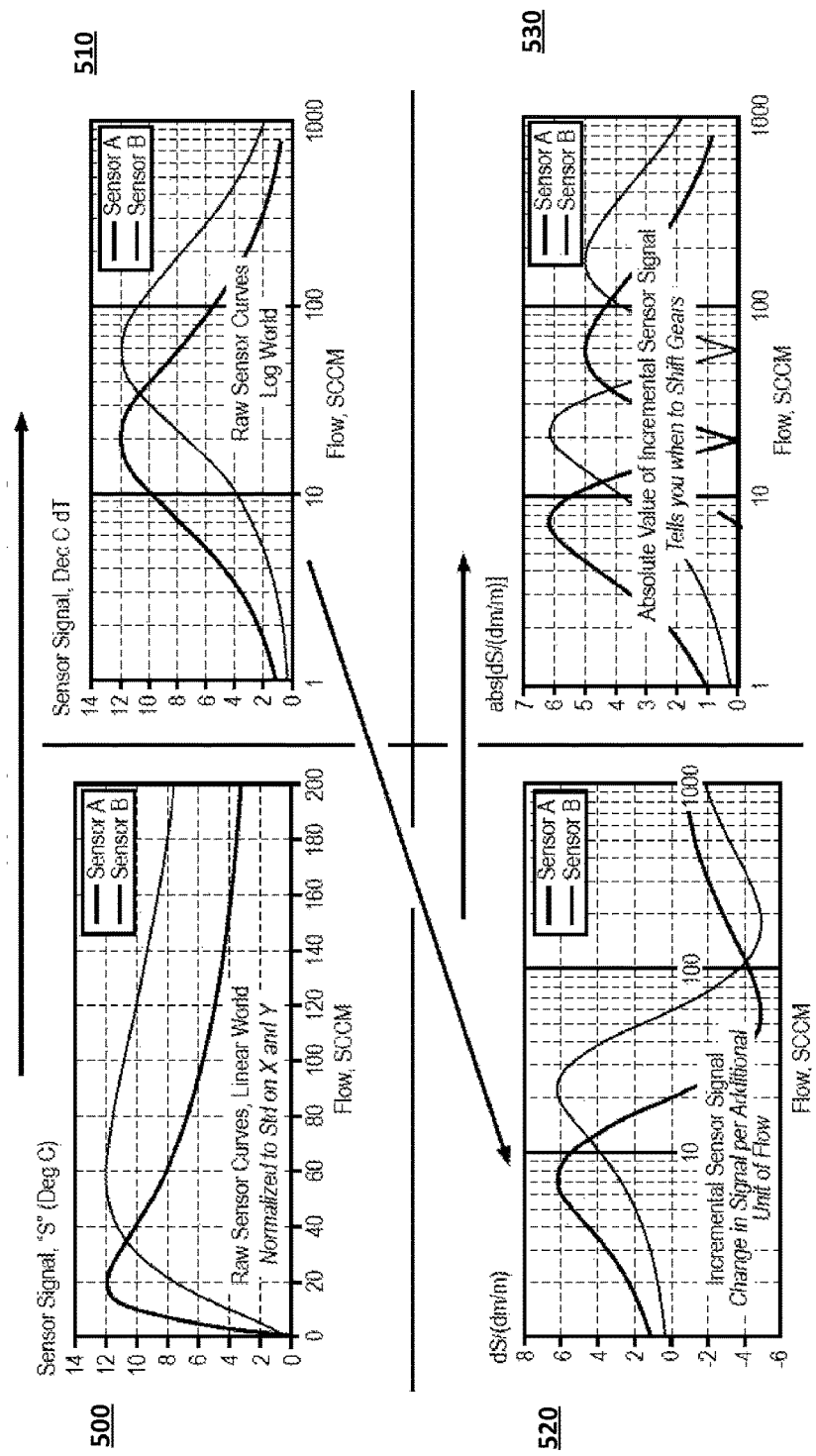
Figure 5B:
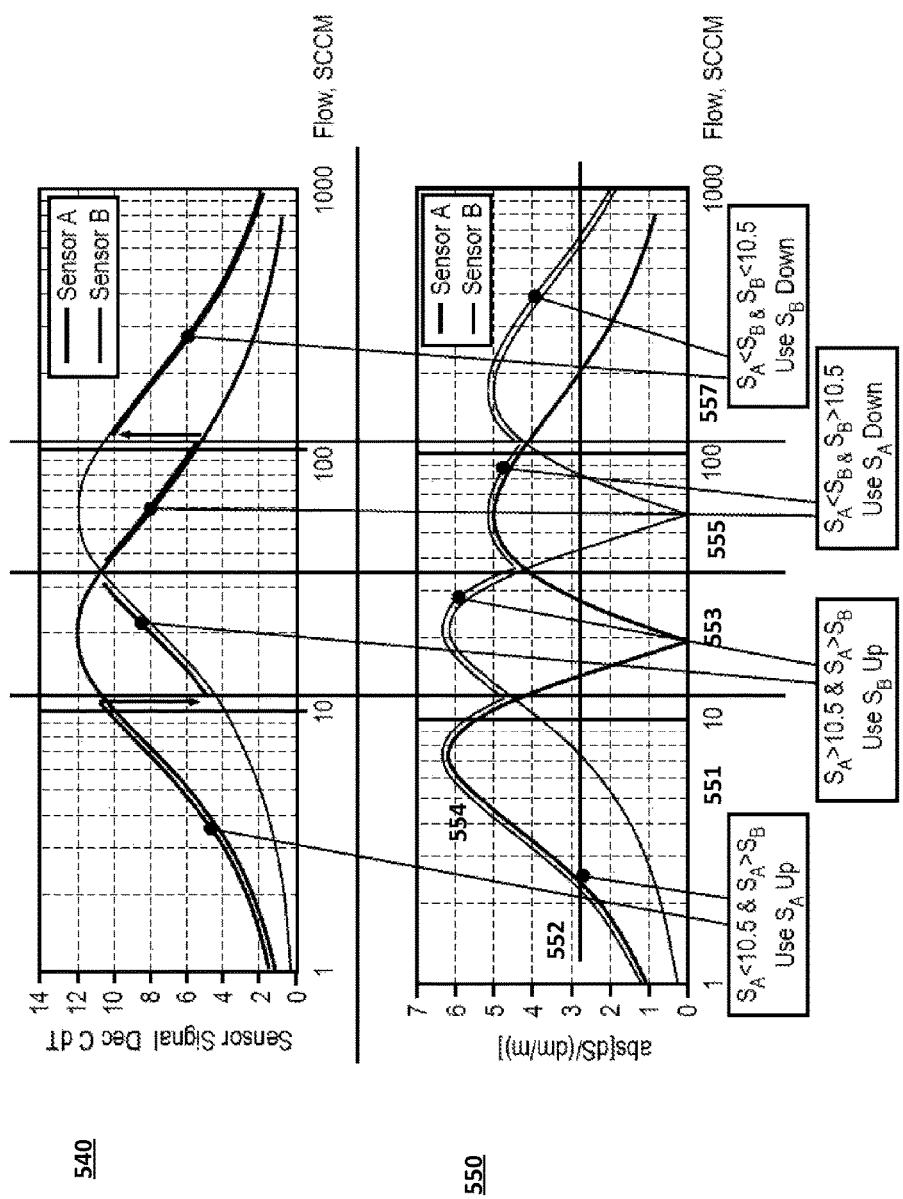

In FIG. 4, at step 410, first and second operating curves for first and second thermal sensors are superimposed. Graph 500 of FIG. 5A shows operating curves for two thermal sensors on a linear graph (i.e., linear x-axis). When transformed to a logarithmic graph (i.e., logarithmic x-axis), the bell curve shape and negative slopes are more prevalent. As discussed above, the 100% full scale flow point at inflection points for the operating curves are offset so that the areas of useless data are similarly offset. The inflection points can reach a similar magnitude or differ. Given use of both the positive and negative slopes of the two operating curves with offsetting invalid ranges, the range of continuous valid readings is increased. In some embodiments, the range of valid readings need not be continuous as some mass flow rates may not have such tight tolerance requirements.

At step 420, it is determined which thermal sensor has the highest accuracy for various mass flow rates. On the operating curve, accuracy increases with higher absolute slope values (i.e., highest slope or absolute value of incremental sensor shift). Graph 520 shows slope values of graph 510.

Albeit offset, the operating curves both initially have an increasingly positive slope that is reduced to zero at the point of inflection. Afterwards, both operating curves have an increasingly negative slope that is eventually eroded near the end of the bell curve. Because both positive and negative slopes are utilized, graph 530 shows an absolute value of slope relative to graph 520. As a result, graph 530 reveals 4 maximum absolute slope values.

At step 430, invalid operating curve areas around points of inflection are identified. Graph 550 shows a minimum absolute slope value needed to maintain accuracy at line 552 which is horizontal to the x-axis. All absolute slope values below the threshold are invalid as not meeting 1% accuracy but still may be utilized for less accurate flow measurement. The invalid areas identified in graph 550, when traced to the logarithmic graph of 540 negate areas around the points of inflections. Further, there are areas on the front end and tail of the bell curve that are invalid but still may be useful for cruder measurements. Preferably, invalid areas are set to be out of range for useful mass flow rates of process gas.

At step 440, zone boundaries are set for ranges of values of superimposed curves. In other words, the x-axis is divided into a list of abutting zones and an appropriate thermal sensor is assigned within each zone. In a first embodiment, a zone ends when the associated sensor no longer has valid values, even if that thermal sensor is not always the most accurate. This allows more freedom in designing zone boundaries. In a second embodiment, the most accurate thermal sensor is always selected. To do so, the zone boundaries are set at an intersection between absolute slope values as shown by line 554.

In graph 550, four different zones 551, 553, 555 and 557 are identified, using the most accurate thermal sensor embodiment. In zone 1 551, sensor 1 is assigned as having the largest absolute slope value until approaching full scale. In zone 2 553, sensor 2, although having a lower output signal value, is assigned with a larger absolute slope value due to sensor 1 reaching a point of inflection. In zone 3 555, sensor 1 is assigned as it increases an absolute slope value on a negative slope of the operating curve while sensor 2 approaches a point of inflection. In zone 4 557, both sensors are on a negative slope of operating curve, but sensor 2 is assigned as it increases an absolute slope value and sensor 1 approaches a tail of the bell curve of graph 540. Many other embodiments are possible, for example, having non-continuous zones, having more or less than four zones, and the like.

Figure 6A:
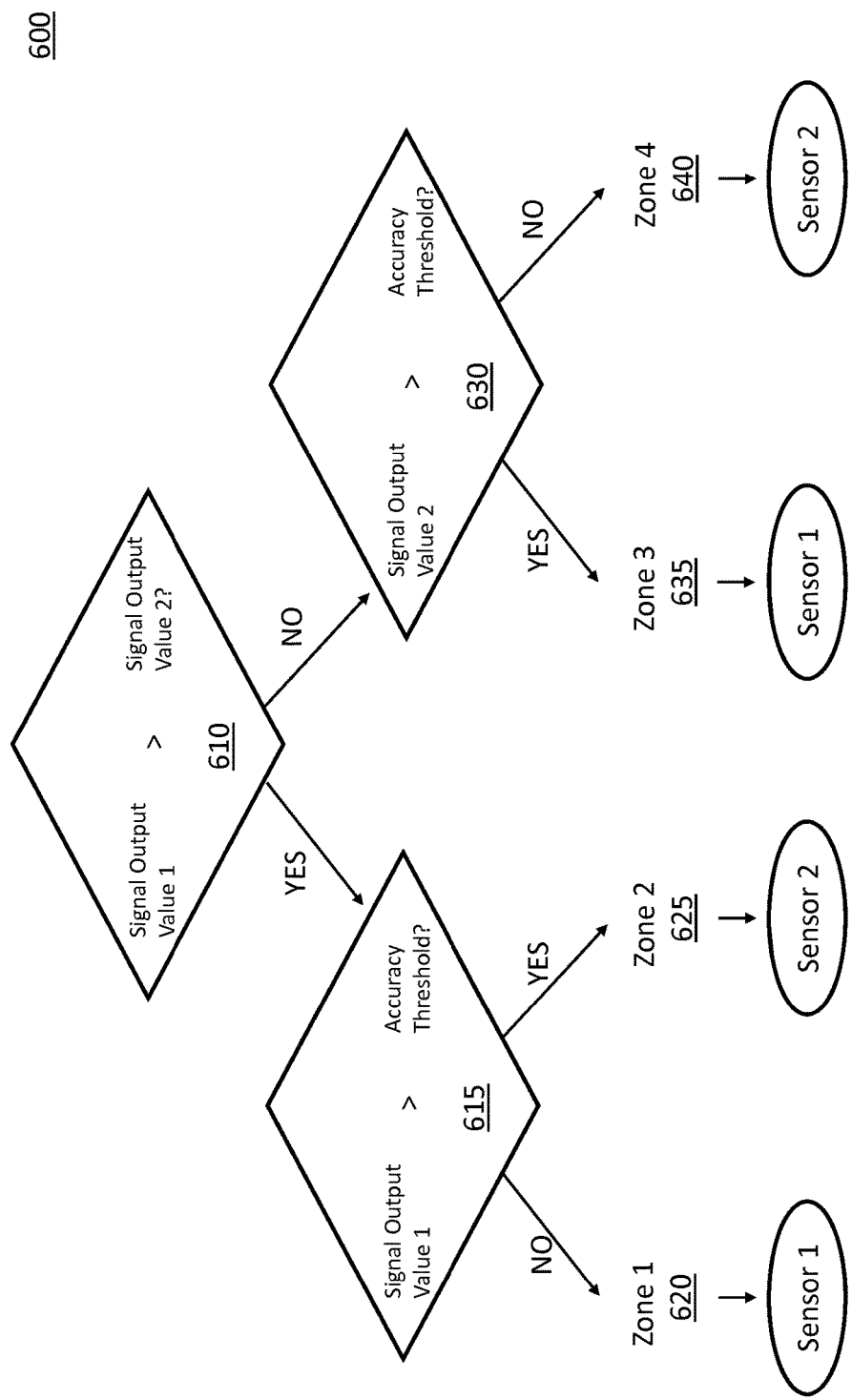

FIG. 6A is flow diagrams illustrating formation of zones and assignment of preferred thermal sensors to each zone, according to an embodiment. Rather than using absolute slope values to identify zones as in FIG. 5B, raw output signal values at different mass flow rates can be used for configuration of zone look-up tables.

At step 610, it is determined which output signal value is higher at a particular mass flow rate of the operating curves. If sensor 1 is higher, it is next determined if sensor 1 is within its threshold for accuracy as determined by the point of inflection. The 1% accuracy level is only achievable up to a certain output signal value or percentage of full scale flow. If the maximum has not yet been reached, then zone 1 is identified at 620 and the output signal reading for sensor 1 is preferred. If the threshold has been exceeded, then zone 2 is identified at 625 and the output signal value for sensor 2 is preferred.

If sensor 2 is higher at step 610, it is next determined if sensor 2 exceeds its threshold output signal value for accuracy. If not, then zone 3 is identified at 635 and the output signal reading for sensor 1 is preferred. If the threshold has been exceeded, then zone 4 is identified at 640 and the output signal value for sensor 2 is preferred.

Figure 6B:
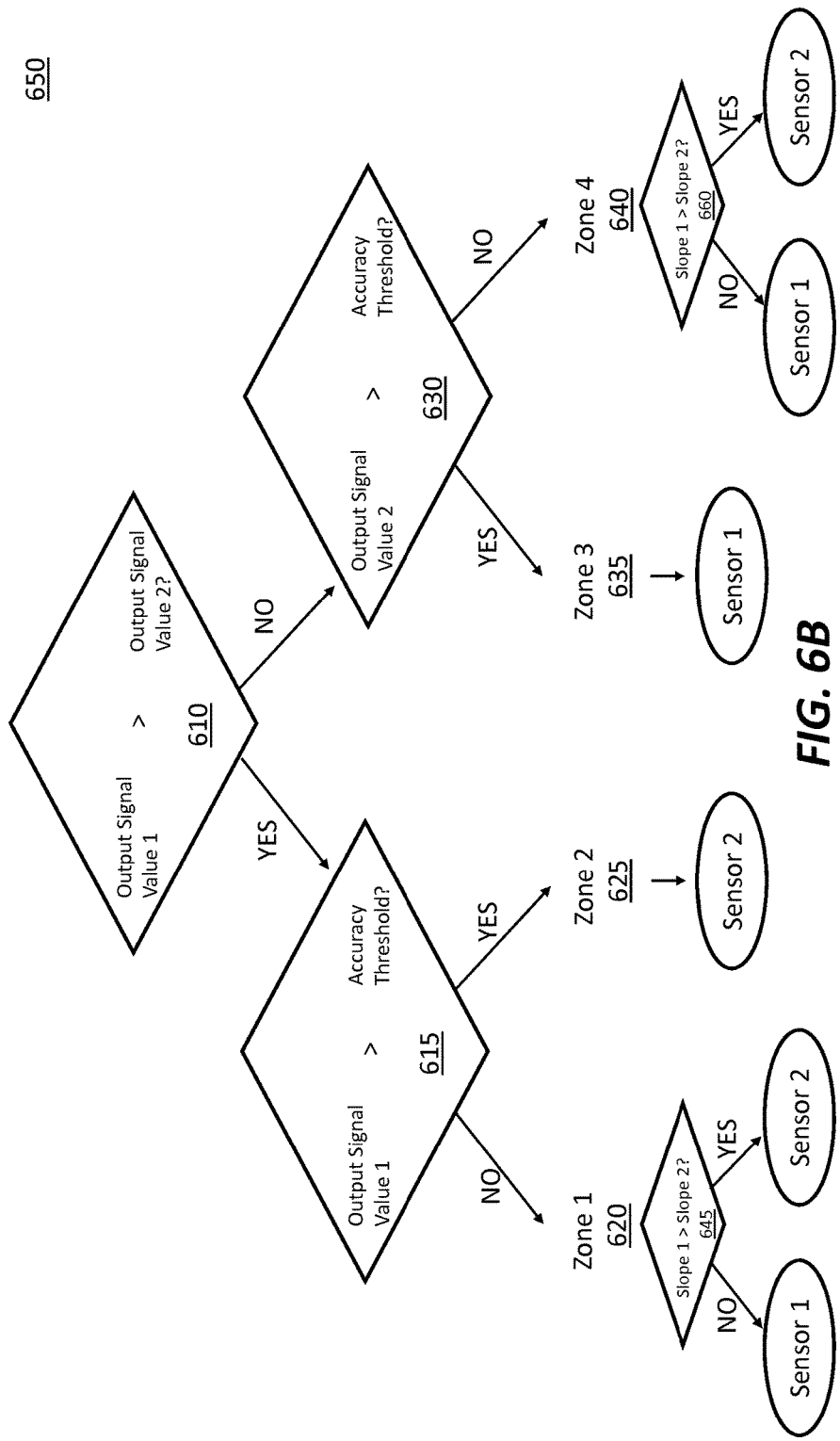

FIG. 6B provides additional steps of optimizing accuracy when selecting between thermal sensors, amounting to a hybrid between the use of output signal values and slopes for determining preferred thermal sensors. For example, in some areas of zone 1 and zone 4, both thermal sensors can provide sufficient accuracy. However, larger slopes lead to more accuracy, so an additional level of accuracy refinement is achieved by determining which of the eligible thermal sensors has the large slope at that point.

Accordingly, at 645, if slope 1 is larger in zone 1, sensor 1 is preferred, and if slope 2 is larger, sensor 2 is preferred. Similarly, at 660, if slope 1 is larger in zone 4, sensor 1 is preferred, and if slope 2 is larger, sensor 2 is preferred.

IV. Generalities of the Disclosure

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A selector logic for a mass flow meter, the selector logic utilizing the positive and negative slopes of multiple thermal sensors for a wider dynamic accuracy range while delivering a process gas to a semiconductor process, the selector logic comprising:
 a processor; and
 a memory, comprising:
  a first interface to receive first signal readings from a first thermal sensor coupled to receive a pressure drop associated with the process gas across a laminar flow element, the first thermal sensor characterized by a first operating curve having a positive slope portion and a negative slope portion for the first signal readings relative to a first range mass flow values;
  a second interface to receive second signal readings from a second thermal sensor coupled to receive a pressure drop associated with the process gas across the laminar flow element, the second thermal sensor characterized by a second operating curve having a positive slope portion and a negative slope portion for the second signal readings relative to a second range of mass flow values;
  wherein the second operating curve is distinct from the first operating curve due at least to an inflection point between the positive and negative slope portions of the first and second operating curves being offset from each other;
  a zone look-up table comprising a list of zones correlated to pairs of signal readings, to identify a zone for of the first and second signal readings and to retrieve a preferred thermal sensor for the identified zone, the preferred sensor being either the first or second thermal sensors, wherein within each zone, the first and second thermal sensors are either in a positive slope portion or a negative slope portion of associated operating curves;

a zone configuration module to configure a zone table prior to operation, wherein the zone configuration module identifies: a first zone including a positive slope portion of the first operating curve, a second zone including a positive slope portion of the second operating curve and the inflection point of the first operating curve, a third zone including a negative slope portion of the first operating curve and the inflection point of the second operating curve, and a fourth zone including a negative slope portion of the second operating curve of the second operating curve; and a mass flow processor to map an output signal value of the preferred thermal sensor to a mass flow value for the identified zone, wherein the mass flow meter is configured to deliver the process gas during the semiconductor manufacturing process corresponding to the mapped output signal value with a widened dynamic accuracy range.

2. The selection logic of claim 1, wherein the selection module outputs either the first or second signal reading in accordance with the assigned thermal sensor for the zone to a processor, wherein the processor calculates a mass flow rate of the process gas.

3. The selector logic of claim 1, wherein:
the zone table is configured by a zone configuration module to configure a zone table prior to operation,
wherein the zone configuration module assigns:
the first zone to the first thermal sensor,
the second zone to the second thermal sensor,
the third zone to the first thermal sensor, and
the fourth zone to the second thermal sensor.

4. The selector logic of claim 1, wherein:
the zone table is configured by a zone configuration module to configure a zone table prior to operation,
wherein the zone configuration module assigns:
the first zone to the first thermal sensor if a positive slope of the first operating curve is greater than a positive slope of the second operating curve at the first and second signal reading values, and if not, to the second thermal sensor,
the second zone to the second thermal sensor,
the third zone to the first thermal sensor, and
the fourth zone to the second thermal sensor if the negative slope of the second operating curve is greater than a negative slop of the first operating curve at the first and second signal values, and if not, to the second thermal sensor.

5. The selector logic of claim 1, wherein:
the zone table is configured by a zone configuration module to configure a zone table prior to operation,
wherein the zone configuration module assigns:
the first zone to the first thermal sensor if a positive slope of the first operating curve is greater than a minimum threshold, and if not, to the second thermal sensor,
the second zone to the second thermal sensor,
the third zone to the first thermal sensor, and
the fourth zone to the second thermal sensor if a negative slope of the second operating curve is greater than a minimum threshold, and if not, the first thermal sensor.

6. The selector logic of claim 1, wherein the list of zones of the zone table are continuous over the total range of mass flow values.

7. The selector logic of claim 1, wherein the list of zones of the zone table are not continuous over the total range of mass flow values, due to an accuracy requirement.

8. The selector logic of claim 1, wherein each zone provides an accuracy above 1% or another predefined percentage.

9. The selector logic of claim 1, wherein the inflection points are located at a transition between the positive slope portions and the negative slope portions, and the inflection points represent 100% of full scale flow as the highest possible signal readings.

10. The selector logic of claim 1, wherein a slope at the inflection points corresponds to changes in the first and second signal readings that is too small relative to the associated changes in pressure drops to meet an accuracy requirement.

11. The selector logic of claim 1, wherein the first and second operating curves, and the resulting list of zones, vary for different process gases.

12. The selector logic of claim 1 embedded in a mass flow meter (MFM), wherein the MFM further comprises:
a conduit including a laminar flow element that has a conductance causing a pressure drop on the process gas;
the first thermal sensor coupled on either side of the laminar flow element; and
the second thermal sensor coupled on either side of the laminar flow element.

13. The selector logic of claim 12, embedded in the MFM, wherein the first and second thermal sensors are connected in parallel with the laminar flow element, the first thermal sensor having a first inner diameter and the second thermal sensor having a second inner diameter differing from the first inner diameter, causing a variance in full scale flows for the first and second thermal sensors.

14. The selector logic of claim 12, embedded in the MFM, wherein the first and second thermal sensors are connected in series with the laminar flow element, the first thermal sensor having first coils of a first length and the second thermal sensor having second coils of a second length differing from the first length, causing a variance in full scale flows for the first and second thermal sensors.

15. The selector logic of claim 1, receiving more than the first and second sensor readings, wherein more than the first and second thermal sensors are eligible for identification as the preferred thermal sensor in determining mass flow values.

16. The selector logic of claim 1, wherein the mass flow meter is part of a mass flow controller that also includes a valve and a controller.

17. A computer-implemented method in selector logic for a mass flow meter utilizing multiple thermal sensors for a wider dynamic range in delivery of a process gas to a process, the method comprising the steps of:
receiving, at a first interface, first signal readings from a first thermal sensor coupled to receive a pressure drop associated with the process gas across a laminar flow element, the first thermal sensor characterized by a first operating curve having a positive slope portion and a negative slope portion for the first signal readings relative to a first range mass flow values;
receiving, at a second interface, second signal readings from a second thermal sensor coupled to receive a pressure drop associated with the process gas across the laminar flow element, the second thermal sensor characterized by a second operating curve having a positive slope portion and a negative slope portion for the second signal readings relative to a second range of mass flow values, wherein the second operating curve is distinct from the first operating curve due at least to an inflection point between the positive and negative slope portions of the first and second operating curves being offset from each other;

accessing a zone table comprising a list of zones correlating to pairs of signal readings to identify a zone for of the first and second signal readings and to retrieve a preferred thermal sensor for the identified zone, the preferred sensor being either the first or second thermal sensors, wherein within each zone, the first and second thermal sensors are either in a positive slope portion or a negative slope portion of associated operating curves;

mapping an output signal value of the preferred thermal sensor to a mass flow value for the identified zone; and delivering the process gas, during the semiconductor manufacturing process, corresponding to the mapped output signal value with a widened dynamic accuracy range.

* * * * *